March 16, 1965 G. PASQUETTI 3,173,172
MACHINE FOR MANUFACTURING FLEXIBLE TUBULAR BODIES
Filed May 25, 1962 4 Sheets-Sheet 1
Fig.1 Fig.2 Fig.3
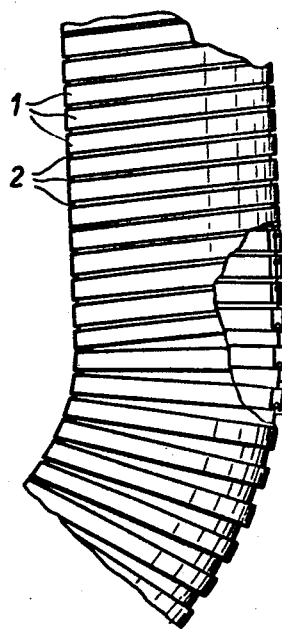
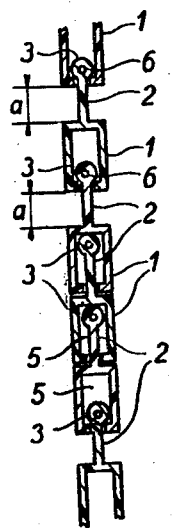
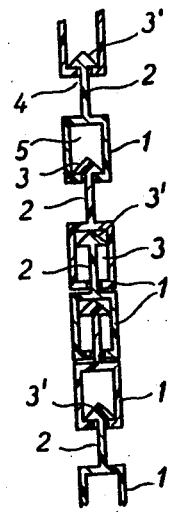
Fig.4 Fig.5
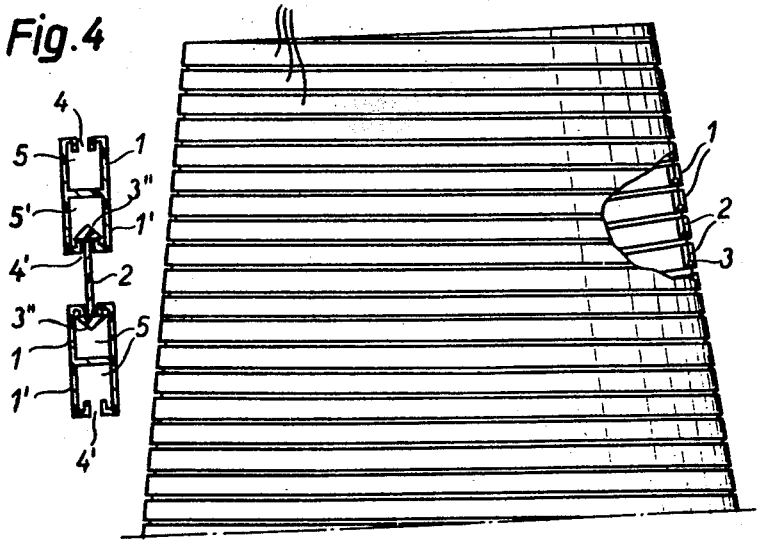

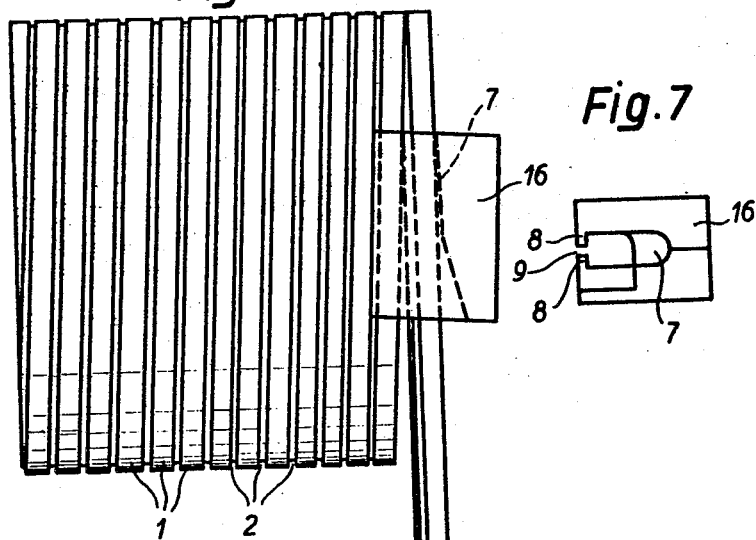
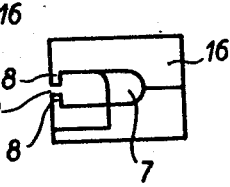
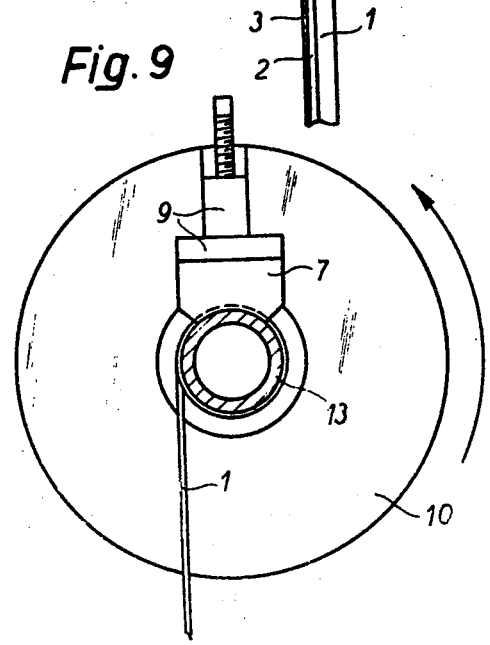

March 16, 1965   G. PASQUETTI   3,173,172
MACHINE FOR MANUFACTURING FLEXIBLE TUBULAR BODIES
Filed May 25, 1962   4 Sheets-Sheet 4

United States Patent Office 3,173,172
Patented Mar. 16, 1965

3,173,172
MACHINE FOR MANUFACTURING FLEXIBLE
TUBULAR BODIES
Glauco Pasquetti, 103 Via Sanvito Silvestro, Varese, Italy
Filed May 25, 1962, Ser. No. 197,700
Claims priority, application Italy, June 19, 1961,
11,502/61; Aug. 16, 1961, 15,246/61
2 Claims. (Cl. 18—8)

This invention relates to hoses of plastics, such as polyvinyl chloride or other thermoplastic material, which are made by helically winding upon itself an extruded plastic element to produce a convolution with adjacent edges of the convolution interconnected. For this purpose the extruded element which can be produced in any length desired is of a special profile in cross section and comprises according to this invention a box-shaped portion formed on one side with a slot and on its opposite side with a shank ending by an enlargement or head portion. The slot provided at one end of the box-shaped portion is slightly narrower than the head portion provided on the opposite side of the box-shaped portion and slightly larger than the shank carrying the head portion. The extruded element is helically convoluted on itself as mentioned above by the head portion on the shank being inserted through the slot which can be elastically widened by virtue of the properties of the material used within the hollow in the box-shaped portion of the same element.

The height of the shank inclusive of its head portion approximately equals the depth of the hollow in the box-shaped portion of the element. On forming the hose by helically convoluting on itself the extruded element and by inserting the head portion on the shank into the box-shaped portion, the edges of the element can be caused to intermesh more or less tightly. In fact the shank can fully penetrate into the box-shaped portion, whereby the box-shaped portion will be convoluted on itself, or the said shank can be fully withdrawn from the box shaped portion whereby the head only on the shank is left within the box-shaped portion of the element and the box-shaped portions of the consecutive turns of the helix are then most spaced.

Since the slot in the box-shaped portion leaves a certain clearance with respect to the shank fitting therein, the consecutive turns instead of extending parallel and being more or less drawn together by their box-shaped portions, can be differently inclined, whereby the hose can extend either straight or can be bent in any direction, its radius of curvature being variable down to a minimum radius which essentially depends upon the height of the shank and upon the diameter of the hose.

The hoses manufactured according to this invention can be made of stiff or flexible thermoplastic material, reinforced if desired by a thread or wire which is extruded simultaneously with the element and is enclosed by the head portion on the shank.

Depending upon the plastic material employed and use for which the hose is intended, the hoses can be transparent, translucent, opaque, of one or several colors.

The hoses can be employed, for instance, as protective sheaths for electric wires and cables, hose for vacuum cleaners, etc., and the tubular bodies can be used for making other articles, such as lampshades, pot holders and containers generally, the articles being of any revolution surface, in that the generatrix may be whatever, such as rectilinear, inclined instead of parallel with the axis of rotation, curvilinear with a constant or variable radius, etc., simply by varying the diameter of the consecutive turns of the helix, which can be obtained by sliding the intermeshing parts with a view to increasing or decreasing the diameter of the said turns and inclination of a turn with respect to the adjacent one.

The accompanying drawings show by way of a non-limiting example embodiments of this invention.

FIG. 1 is a part sectional view of a hose section according to this invention;

FIGS. 2 and 3 show two embodiments of the extruded element used for manufacturing the hose. The figures show in the axial sectional representation of a section of the hose wall how the consecutive turns interengage and how they can be drawn together or apart at will within the limits admitted by the shank length;

FIG. 4 shows a modification of FIGURES 2 and 3;

FIG. 5 shows a frusto-conical body obtained according to this invention, which may be used for instance for making a lampshade or a pot holder;

FIGURES 6 and 7 show a device for interengaging by hand the consecutive turns of the tubular member;

FIGURES 8 and 9 show a device for mechanically interengaging the consecutive turns of the element for forming a hose in part longitudinal section and part cross sectional view, respectively;

Figure 8:
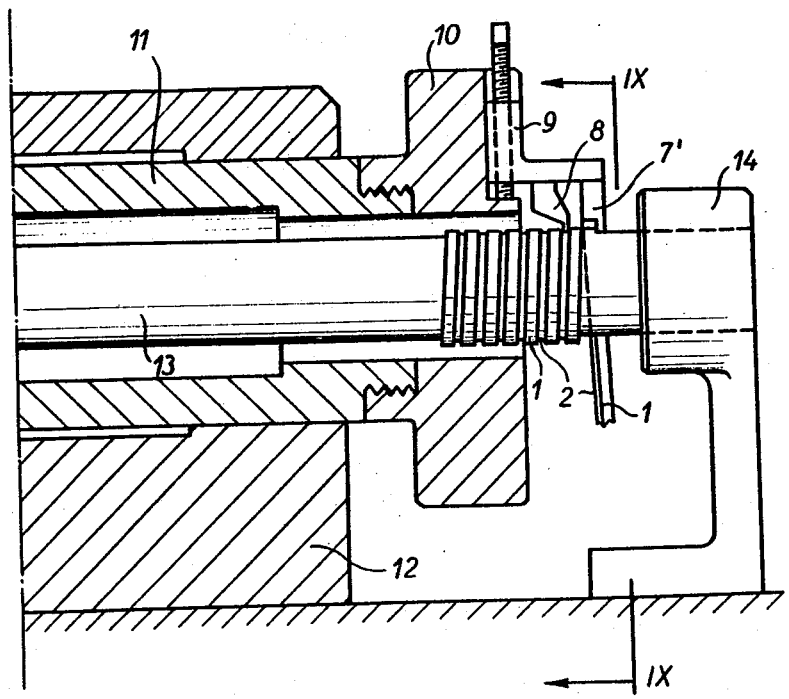

Referring to FIGS. 1 to 3 the hose according to this invention is made from an extruded element comprising a box-shaped portion 1 carrying in an axial direction on one side a shank or rib 2 ending by a mushroom-shaped head 3 and formed on its opposite side with a slot 4.

In the sectional views of FIGS. 2 and 3 the head portion 3 on the shank 2 is of circular and respectively of arrow-shape in cross-section, whereby the head portion can in any case be forced into the hollow 5 in the box-shaped portion through the slot 4.

In the embodiment shown in FIG. 2 the head portion 3, which is of circular shape cross-section, is adapted to enclose a reinforcing wire 6.

According to the modification shown in FIG. 4 the box-shaped member is divided, its sections 1, 1' being each formed with an inner hollow 5, 5' and on opposite sides with slots 4, 4'. A flat intermediate section 2 is engaged by the slots 4, 4' of two portions 1, 1', respectively of consecutive turns and is formed at both ends with head portions 3''.

FIG. 7 shows a device in the form of a slide for interengaging by hand the consecutive turns of the helix adapted to form the hose or other revolution body from the extruded element.

FIG. 6 shows in a plan view the operation of the slide, which is denoted by 16, and is formed with an inner hollow adapted to receive the just formed turn which is retained against projections 8 separated by a slit 9 engaging the shank on the extruded element forming the said turn, and with an inclined lateral surface 7 in said hollow, adapted to guide the element to be curved to a turn and to cause it to engage with the previously formed turn.

The inclined wall 7 gradually pushes the extruded element against the last formed turn of the helix by causing its head portion 3 to approach the slit 4 and reach therethrough into the hollow 5 in the box-shaped portion of the last formed turn.

FIGS. 8 and 9 show a mechanical device for effecting the same operation. This device comprises two tools carried by a tool-holder 9, one tool, denoted by 8, engaging the last formed turn, the other tool, denoted by 7 being so inclined as to gradually move the extruded element against the preceding turn of the winding for forming the hose, until the head portion 3 fits through the slot 4 and reaches into the hollow 5 in the box-shaped portion of the said last formed turn.

The tool-holder 9 is carried by a disc 10 associated with a hollow sleeve 11 which is rotated in frame 12. A cylindrical stationary mandrel 13 axially extends within the hollow sleeve 11, the hose forming thereabout.

The tubular mandrel 13 is supported in stationary support 14, the hose sliding as it is being formed along the mandrel 13.

Figure 10:
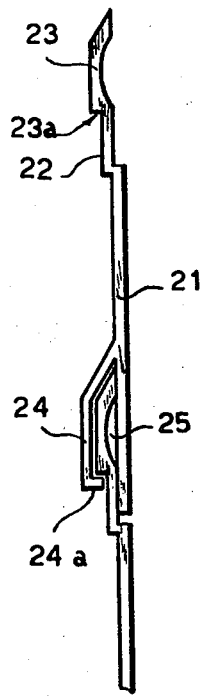
FIGS. 10 and 11 are a detail sectional view and a side view, respectively, of a hose suitable for withstanding internal pressures.
Figure 11:
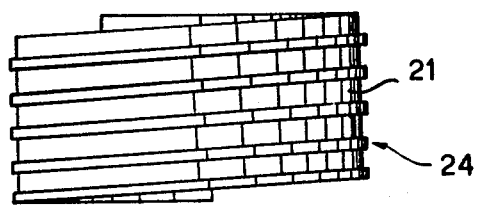

Referring to FIGS. 10 and 11, 21 denotes the flat middle section of an extruded element of plastics, formed on one side with an intermediate step 22 and a bead 23. A shoulder 23a is formed between the step 22 and bead 23.

On the opposite side the cross section of the extruded element is formed with an extension 24 forming together with the flat section 21 a fork defining a hollow 25 opening outwardly. The section 24 ends by a projection 24a facing the inside of the fork.

The extruded element of plastics described above is adapted to be helically convoluted on itself causing the adjacent turns of the helix to interengage as described in order to form hoses as shown in FIG. 11.

The hoses made from the above described extruded element can be made of large diameter and have a smooth inner surface which facilitates circulation of fluids and affords a satisfactory seal.

What I claim is:

1. In a machine for manufacturing a flexible tubular body of the type including one juxtaposed helically convoluted strip-shaped element having engaging sections at adjacent side edges one of which is formed as a hollow body with a longitudinal slot while the other is formed as a flat section extending through the slot having a head portion in the hollow, the machine comprising; a frame, a sleeve rotatably mounted in said frame having one end protruding from said frame, a cylindrical stationary mandrel inside said sleeve, coaxial with the sleeve and having a diameter smaller than the bore of said sleeve, a stationary support for said mandrel situated in front of said sleeve protruding from the machine frame, an annular disc fast with said sleeve end, a pair of cooperating tools carried by said disc, one of said tools being flat and arranged nearer said disc, the other of said tools being laterally shifted from said one tool, a curved edge concentric with said mandrel and spaced from the periphery thereof on said one tool and an edge arranged close to the periphery of the mandrel on said other tool, the last mentioned edge being inclined with respect to the edge of said first tool.

2. Machine as set forth in claim 1, comprising a bracket carrying said tools mounted for radial displacement on said annular disc.

References Cited by the Examiner
UNITED STATES PATENTS

| | | | |
|---|---|---|---|
| 1,133,070 | 3/15 | Subers | 138—135 |
| 2,354,485 | 7/44 | Slaughter | 138—129 X |
| 2,388,297 | 11/45 | Slaughter. | |
| 2,739,089 | 3/56 | Hageltorn | 138—121 X |

CHARLES W. LANHAM, *Primary Examiner.*

EDWARD V. BENHAM, *Examiner.*